(12) United States Patent
Paquin et al.

(10) Patent No.: US 11,073,025 B2
(45) Date of Patent: Jul. 27, 2021

(54) TURBINE BLADE HAVING AN IMPROVED STRUCTURE

(71) Applicant: SAFRAN, Paris (FR)

(72) Inventors: Sylvain Paquin, Moissy-Cramayel (FR); Romain Pierre Cariou, Moissy-Cramayel (FR); Thomas Michel Flamme, Moissy-Cramayel (FR); Adrien Bernard Vincent Rollinger, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 16/604,038

(22) PCT Filed: Apr. 10, 2018

(86) PCT No.: PCT/FR2018/000081
§ 371 (c)(1),
(2) Date: Oct. 9, 2019

(87) PCT Pub. No.: WO2018/189434
PCT Pub. Date: Oct. 18, 2018

(65) Prior Publication Data
US 2020/0157948 A1    May 21, 2020

(30) Foreign Application Priority Data
Apr. 10, 2017   (FR) ...................................... 1700390

(51) Int. Cl.
*F01D 5/18*         (2006.01)
(52) U.S. Cl.
CPC .......... *F01D 5/187* (2013.01); *F05D 2220/32* (2013.01)
(58) Field of Classification Search
None
See application file for complete search history.

(56) References Cited

U.S. PATENT DOCUMENTS

| | | | | |
|---|---|---|---|---|
| 4,770,608 | A | * | 9/1988 | Anderson ............... F01D 5/186 415/115 |
| 5,342,172 | A | * | 8/1994 | Coudray ................. F01D 5/186 416/95 |

(Continued)

FOREIGN PATENT DOCUMENTS

| | | |
|---|---|---|
| EP | 0562944 A1 | 9/1993 |
| EP | 1741875 A1 | 1/2007 |
| WO | WO 2016/151234 A1 | 9/2016 |

OTHER PUBLICATIONS

International Search Report and Written Opinion in corresponding International Application No. PCT/FR2018/000081, dated Nov. 6, 2018 (11 pages).

*Primary Examiner* — Ninh H. Nguyen
*Assistant Examiner* — Jason Fountain
(74) *Attorney, Agent, or Firm* — Bookoff McAndrews, PLLC

(57) ABSTRACT

An aviation turbine blade (10) includes at least a first lower surface cavity (C2) and a first upper surface cavity (C3), each adjacent to a first through-cavity (C1) and a second through-cavity (C4), the first upper surface cavity (C3) being adjacent to the upper surface wall (24), the first lower surface cavity (C2) being adjacent to the lower surface wall (22), each of the first and second through-cavities (C1, C4) extending from the lower surface wall (22) as far as the upper surface wall (24), the second through-cavity (C4) including a first inner wall (P1) extending from the upper surface wall (24) as far as the first through-cavity (C1), and a second inner wall (P2) extending from the lower surface wall (22) as far as the first through-cavity (C1). The first (P1) and second (P2) inner walls are not connected.

8 Claims, 3 Drawing Sheets

(56) References Cited

U.S. PATENT DOCUMENTS

| | | | |
|---|---|---|---|
| 6,773,230 B2* | 8/2004 | Bather | F01D 5/186 |
| | | | 415/115 |
| 8,475,132 B2* | 7/2013 | Zhang | F01D 5/284 |
| | | | 416/225 |
| 2010/0080687 A1 | 4/2010 | Vance | |
| 2017/0173672 A1* | 6/2017 | Foster | B22C 9/24 |

* cited by examiner

TURBINE BLADE HAVING AN IMPROVED STRUCTURE

CROSS-REFERENCE TO RELATED APPLICATION(S)

This application is the U.S. national phase entry under 35 U.S.C. § 371 of International Application No. PCT/FR2018/000081, filed on Apr. 10, 2018, which claims priority to French Patent Application No. 1700390, filed on Apr. 10, 2017.

FIELD OF THE INVENTION

The present invention relates to the field of high pressure aviation gas turbine blades, more particularly to the inner structure of these blades, and a gas turbine including blades of this type.

STATE OF THE PRIOR ART

The movable blades of a gas turbine of an airplane engine, and particularly of the high pressure turbine, are subjected to the very high temperatures of the combustion gases during the operation of the engine. These temperatures reach values which are considerably higher than those which the different parts which are in contact with these gases can endure without damage, which has the consequence of limiting their lifetime.

Moreover, an increase in the temperature of the high pressure turbine gasses allows an improvement in the efficiency of an engine, hence the ratio between the thrust of the engine and the weight of an airplane propelled by this engine. Consequently, efforts are made in order to achieve turbine blades which can resist ever greater temperatures, and in order to optimize the cooling of these blades.

Thus it is known to equip these blades with cooling circuits aspiring to reduce the temperature of the latter. Thanks to circuits of this type, the cooling air (or "cold" air) which is generally introduced into the blade through its root, passes through it by following a path formed by cavities provided in the thickness of the blade before being ejected through openings opening on the surface of the blade.

Cooling circuits of this type are called "advanced" when they are composed of several independent cavities in the thickness of the blade, or when some of these cavities are dedicated to localized cooling. These cavities allow defining a blade compatible with the performance requirements of the engines and the lifetime of the parts. As an example of an advanced cooling circuit, the cooling circuit as presented in EP 1741875 can be mentioned.

Advanced circuits of this type have the disadvantage of generating a large difference in temperature between the outer walls of the blade in contact with the stream and the walls in the core of the blade. These large differences in temperature induce dilations and forces which can endanger the mechanical strength of the blade during operation and thus impact its lifetime. The dilations of the walls in the ortho-radial plane generate, in particular, forces around the junction zones between the core of the blade and the walls of the blade, which can cause a break.

The solutions proposed to respond to these problems consist of increasing the thickness of different walls in order to improve their strength. It is well understood, however, that this penalizes the general performance of the blade.

PRESENTATION OF THE INVENTION

The present disclosure relates to an aviation turbine blade extending in the radial direction from a blade root as far as an upper partition wall, said blade comprising a plurality of inner cavities defining at least one cooling circuit, each of said inner cavities being defined by walls among inner walls, a lower surface wall, an upper surface wall, the blade root and the upper partition wall, said blade being characterized in that it comprises at least a first lower surface cavity and a first upper surface cavity, each adjacent to a first through-cavity and to a second through-cavity, the first upper surface cavity being adjacent to the upper surface wall, the first lower surface cavity being adjacent to the lower surface wall, each of the first and second through-cavities extending from the lower surface wall as far as the upper surface wall, the second through-cavity comprising a first inner wall extending from the upper surface wall as far as the first through-cavity, and a second inner wall extending from the lower surface wall as far as the first through-cavity, said first inner wall and second inner wall not being connected.

According to one example, the second through-cavity comprises a portion extending between the first lower surface cavity and the first upper surface cavity.

According to one example, the first lower surface cavity is fluidly connected to the first through-cavity and the first upper surface cavity is fluidly connected to the second through-cavity.

According to one example, the blade comprises a second lower surface cavity and a third through-cavity, in which the third through-cavity extends from the lower surface wall as far as the upper surface wall, each of the second lower surface cavity and the second upper surface cavity is adjacent to the second through-cavity and to the third through-cavity, the second upper surface cavity is adjacent to the upper surface wall, the second lower surface cavity is adjacent to the lower surface wall, and in which the third through-cavity comprises a third inner wall extending from the upper surface wall as far as the second through-cavity, and a fourth inner wall extending from the lower surface wall as far as the second through-cavity, said third inner wall and fourth inner wall not being connected.

The third through-cavity then typically comprises a portion extending between the second lower surface cavity and the second upper surface cavity.

The second lower surface cavity is then typically fluidly connected to the first upper surface cavity, and the second upper surface cavity is fluidly connected to the third through-cavity.

According to one embodiment, the blade comprises a third lower surface cavity, a third upper surface cavity and a fourth through-cavity, in which the fourth through-cavity extends from the lower surface wall as far as the upper surface wall, each of the third lower surface cavity and the third upper surface cavity is adjacent to the third through-cavity and to the fourth through-cavity, the third upper surface cavity is adjacent to the upper surface wall, the third lower surface cavity is adjacent to the lower surface wall, and in which the third through-cavity comprises a fifth inner wall extending from the upper surface wall as far as the fourth through-cavity, and a sixth inner wall extending from the lower surface wall as far as the fourth through-cavity, said fifth inner wall and sixth inner wall not being connected.

All or part of the through-cavities can comprise at least one reinforcing beam disposed inside one of said through-cavities and connecting the blade root to the upper partition wall, said reinforcing beam not being connected to the inner walls, the lower surface wall and the upper surface wall.

The present disclosure also relates to a gas turbine including blades of the present disclosure.

BRIEF DESCRIPTION OF THE DRAWINGS

The invention and its advantages will be better understood upon reading the detailed description given hereafter of different embodiments of the invention, given by way of non-limiting examples. This description refers to the appended pages of figures, in which.

In all the figures, the common elements are identified by identical numerical labels.

DETAILED DESCRIPTION OF EXEMPLARY EMBODIMENTS

Figure 1:
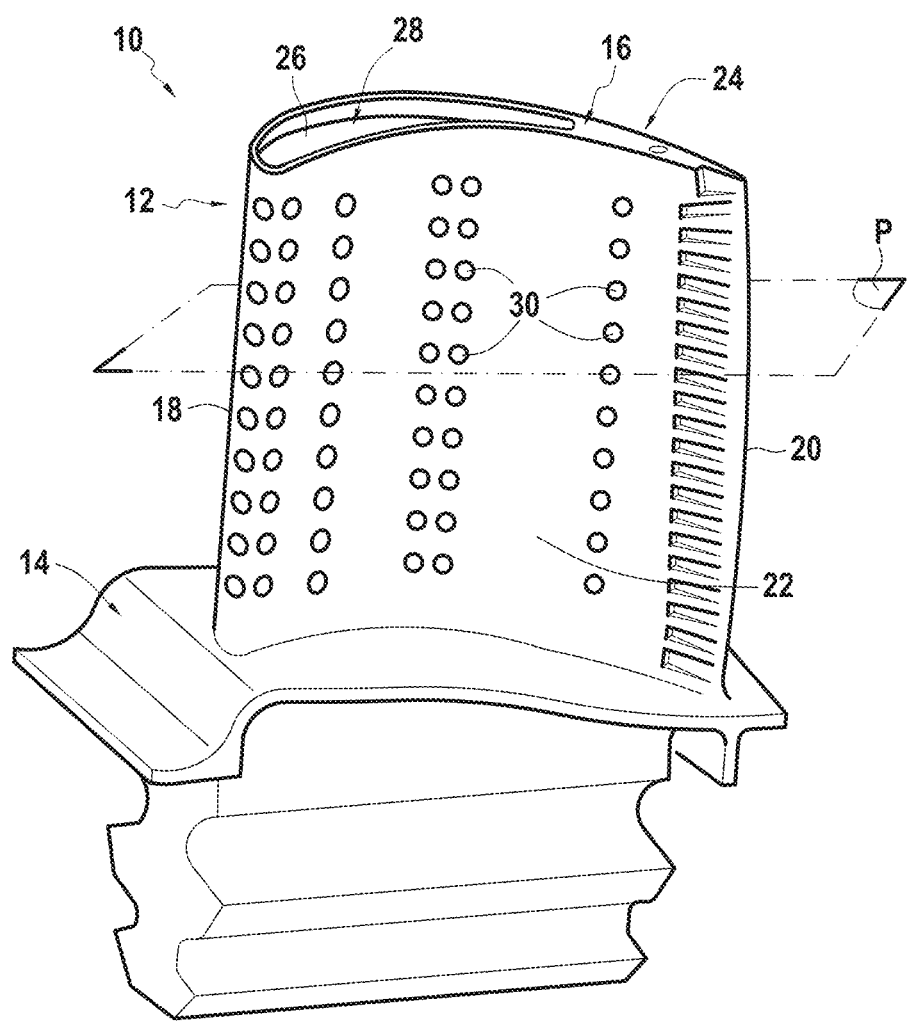
FIG. 1 shows an example of a perspective view of an aviation turbine blade.
Figure 2:
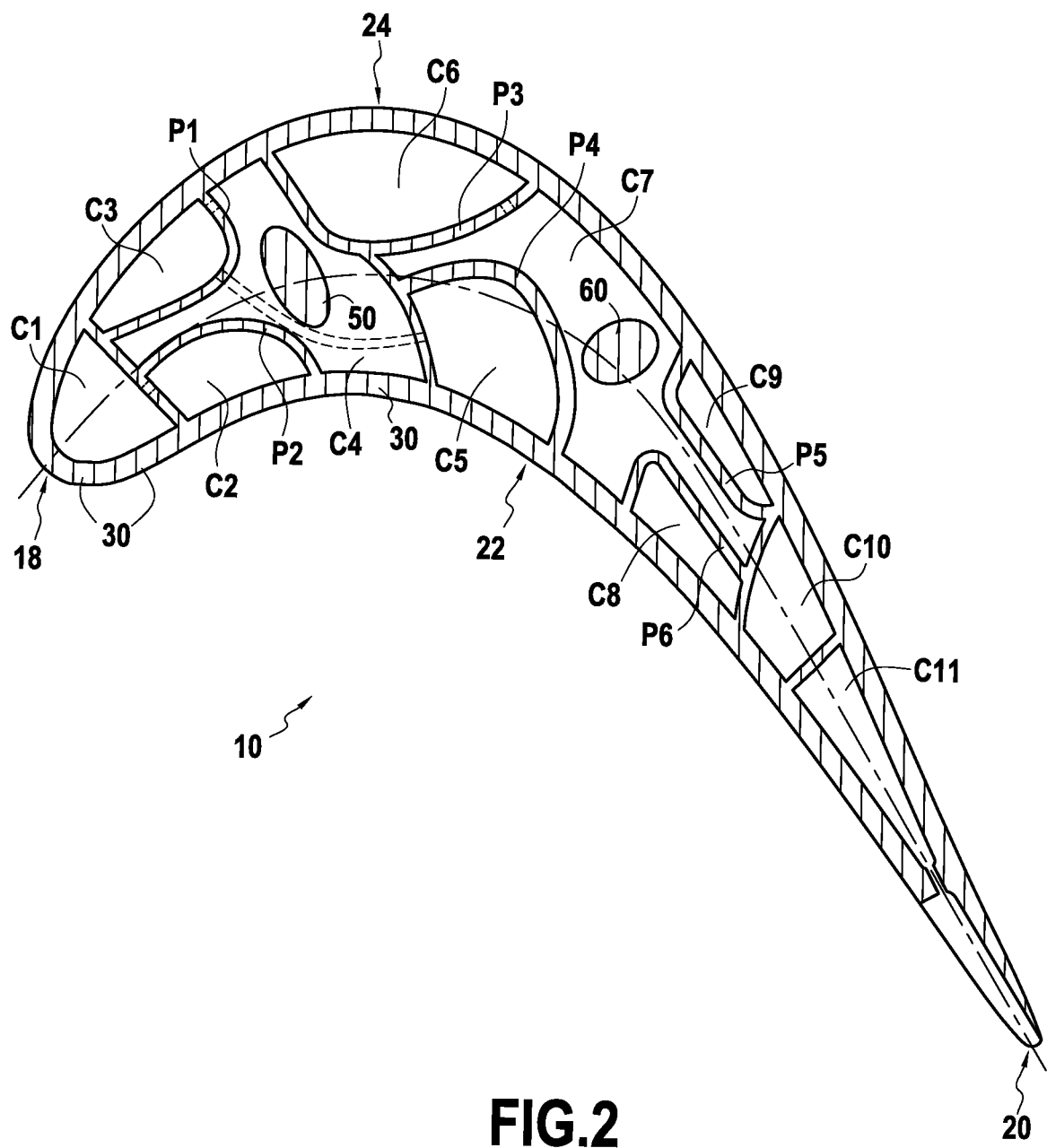
FIG. 2 shows an example of a section view of a blade of this type.
Figure 3:
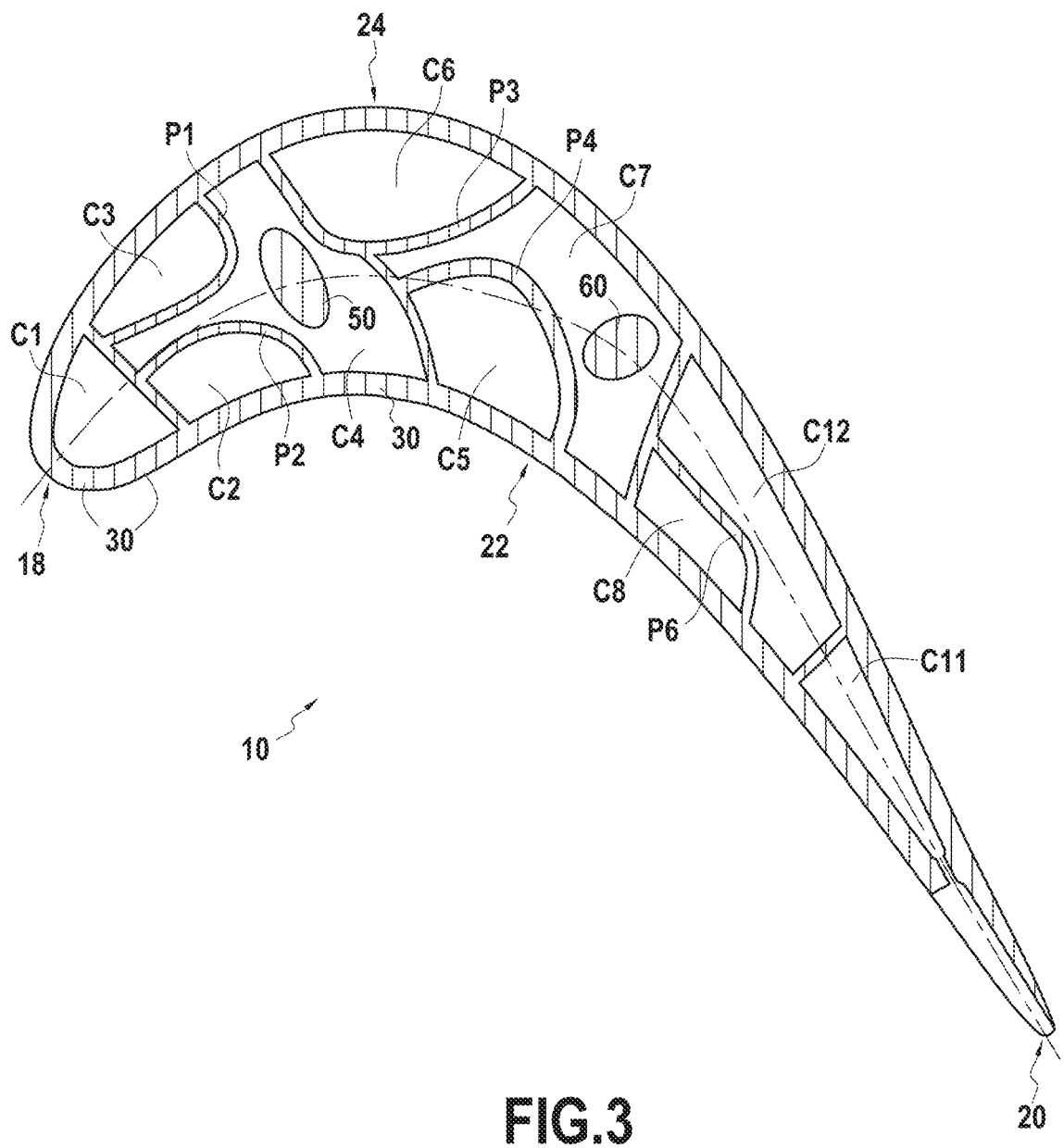
FIG. 3 shows another example of a section view of a blade of this type.

The invention is described hereafter with reference to FIGS. 1 to 3.

FIG. 1 illustrates a movable blade 10, metal for example, of a high pressure turbine of a turbine engine. Of course, the present invention can also apply to other movable or fixed blades of the turbine engine.

The blade 10 includes an aerodynamic surface 12 (or airfoil) which extends radially between a blade root 14 and a blade tip 16.

The blade root 14 is adapted to be mounted in a disk of the rotor of the high pressure turbine, the blade tip 16 being radially opposite to the blade root 14.

The aerodynamic surface 12 has four distinct zones: a leading edge 18 disposed facing the hot gas flow originating from the combustion chamber of the turbine engine, a trailing edge 20 opposite to the leading edge 18, a lower surface wall 22 and an upper surface wall 24, the lower surface 22 and upper surface 24 walls connecting the leading edge 18 to the trailing edge 20.

At the blade tip 16, the aerodynamic surface 12 of the blade is closed by a transverse wall 26. Moreover, the aerodynamic surface 12 extends radially slightly beyond this transverse wall 26 so as to form a trough 28 called hereafter the blade squealer tip. This squealer tip 28 therefore has a bottom formed by the transverse wall 26, an edge formed by the aerodynamic surface 12 and it is open toward the blade tip 16. Openings 30 are typically formed in the lower surface wall 22 and/or in the upper surface wall 24 so as to allow air intake and/or backflow between the inner cavities of the blade and the outer environment.

The blade 10 typically comprises one or more cooling circuits formed by the inner structure of the blade 10 which is described hereafter.

FIGS. 2 and 3 are two section views of two variants of a blade as presented in FIG. 1, for example along the section plane P shown in FIG. 1.

As can be seen in these figures, the blade 10 is hollow, and its inner volume is composed of a plurality of cavities separated by inner walls.

In the examples shown in FIG. 2, the blade 10 comprises 11 cavities designated by labels C1 to C11.

As can be seen in FIG. 2, for the example shown, a part of these inner cavities, in this case the inner cavities C1, C4, C7, C10 and C11, extend between the lower surface wall 22 and the upper surface wall 24; they are thus designated as being the inner through-cavities. The inner cavities C1, C4, C7, C10 and C11 are respectively designated first, second, third, fourth and fifth inner through-cavities. The first through-cavity C1 forms the leading edge 18 of the blade 10, while the fifth through-cavity C11 is positioned in the continuation of the inner cavity C10 and forms the trailing edge 20 of the blade 10.

The remaining inner cavities, namely the inner cavities C2, C3, C5, C6, C8 and C9 are not through cavities, i.e. each is adjacent to one of the lower surface 22 or upper surface 24 wall, but do not extend as far as the other of the lower surface 22 or upper surface 24 wall.

Among these non-through inner cavities, the inner cavities C3, C6 and C9 are adjacent to the upper surface wall 24; they are thus designated respectively first, second and third upper surface cavities. The inner cavities C2, C5 and C8, for their part, are adjacent to the lower surface wall 22; they are thus designated respectively first, second and third lower surface cavities.

It is easily understood that an example of this type of inner structure of the blade 10 is merely illustrative, and that the invention presented can be applied regardless of the inner structure of the blade 10.

As indicated in the preamble of the present patent application, one of the major problem sets for the design of a blade of this type 10 relates to the strength during operation, particularly due to the divergences in dilation occurring in the different regions of the blade 10, and more precisely the forces resulting from them in an ortho-radial plane of the blade 10.

In order to respond to these problem sets, the present disclosure proposes a particular structure for the walls defining the through-cavities and the lower surface and upper surface cavities.

As can be seen in FIG. 2, the second, third and fourth inner through-cavities C4, C7 and C10 have a specific structure, so that their walls extend as far as another inner through-cavity.

More precisely, considering the second inner through-cavity C4, the latter is defined in particular by a first inner wall P1 which extends from the upper surface wall 24 as far as the first through-cavity C1, and by a second inner wall P2 which extends from the lower surface wall 22 as far as the first through-cavity C1. The first inner wall P1 and the second inner wall P2 are not connected. A structure of this type allow the second inner through-cavity C4 to extend between the first lower surface cavity C2 and the first upper surface cavity C3, so that the fluid, which has been heated when passing through the second lower surface cavity C5, then the first upper surface cavity C3, circulates in the second through-cavity C4 and bathes the walls of the first lower surface cavity C2 and of the first upper surface cavity C3, and thus reduces the thermal gradient between the outer walls of the blade 10 (i.e. the lower surface wall 22 and the upper surface wall 24) and the inner walls (here the first inner wall P1 and the second inner wall P2). In addition, not connecting the first inner wall P1 and the second inner wall P2 allows reducing the forces around their respective junctions with the supper surface and inner surface walls, for example with respect to a structure in which these inner walls P1 and P2 would be merged.

The third through-cavity C7 has a substantially distinct structure. This third through-cavity C7 is defined in particular by a third inner wall P3 which extends from the upper surface wall 24 as far as the second through-cavity C4, by a fourth inner wall P4 which extends from the lower surface wall 22 as far as the second through-cavity C4, the third inner wall P3 and the fourth inner wall P4 not being connected, and is also defined by a fifth inner wall P5 which extends from the upper surface wall 24 as far as the fourth through-cavity C10, by a sixth inner wall P6 which extends from the lower surface wall 22 as far as the fourth through-cavity C10, the fifth inner wall P5 and the sixth inner wall P6 not being connected and defining respectively the third upper surface cavity C9 with the upper surface wall 24, and the third lower surface cavity C8 with the lower surface wall 22. A structure of this type allows the third through-cavity C7 to extend between the second lower surface cavity C5 and the second upper surface cavity C6, on the one hand, and between the third lower surface cavity C8 and the third upper surface cavity C9 on the other hand, so that the fluid, which has been heated when passing through the third lower surface cavity C8, then the second upper surface cavity C6, circulates in the third through-cavity C7 and bathes the wall of the second and third lower surface cavities C5 and C8 and of the second and third upper surface cavities C6 and C9, and thus reduces the thermal gradient between the outer walls of the blade 10 (i.e. the lower surface wall 22 and the upper surface wall 24) and the inner walls (here the third inner wall P3, the fourth inner wall P4, the fifth inner wall P5 and the sixth inner wall P6). In addition, not connecting the inner walls P3 and P4 on the one hand, and the inner walls P5 and P6 on the other hand, allows a reduction in the forces around their respective junctions with the upper surface and lower surface walls with respect to a structure in which these walls would be merged, two by two.

Each of the lower surface and upper surface cavities is thus adjacent to two through-cavities, and is not adjacent to one other, lower surface or upper surface cavity. What is meant by adjacent is that the cavities considered have at least one wall in common.

A blade 10 having a structure as shown in FIG. 2 is thus advantageous, particularly in that it allows reducing the thermal gradient between the different inner and outer walls of the blade 10, and thus limiting the dilation divergence between the walls which is an important factor for generating forces during operation. Moreover, the fact of achieving air circulation between the different inner walls, particularly between the first inner wall P1 and the second inner wall P2 via the second through-cavity C4 allows controlling the temperature of these inner walls and maintaining them within a range of temperature for which the materials considered have optimal mechanical properties. The same is true for the other inner walls P3 to P6.

The circulation direction of the fluid in the different cavities of the blade forming the cooling system can be defined according to several configurations, the geometry of the inner walls P1 to P6 not being constraining. By way of an example, a configuration in which each lower surface cavity is connected fluidly to at least one through-cavity, and each upper surface cavity is fluidly connected to at least one through-cavity, can be mentioned. Each lower surface and upper surface cavity can also be fluidly connected to another lower surface or upper surface cavity. All or part of the lower surface, upper surface and through cavities can also be connected to the openings 30 provided in the lower surface wall 22 and/or in the upper surface wall 24 of the blade 10.

Moreover, a blade 10 comprising inner walls P1 to P6 as described has improved flexibility compared with a blade 10 having inner walls extending linearly from the lower surface wall 22 as far as the upper surface wall 24, such as for example the case shown in patent application EP 1741875. Indeed, if a blade 10 as shown in FIGS. 2 and 3 is considered, it is noted that it comprises a limited number of transverse walls (i.e. walls extending substantially linearly between the lower surface wall 22 and the upper surface wall 24) compared with the blade shown in patent application EP 1741875 and comprising an equivalent number of inner cavities.

In the example shown in FIG. 3, the fifth inner wall P5 is eliminated, so that the cavities C9 and C10 are consolidated to form a single cavity C12. Such an embodiment allows the achievement of direct cooling of the upper surface wall 24 adjacent to the trailing edge 20 while still retaining a mechanically flexible structure by avoiding forming a transverse wall extending between the lower surface wall 22 and the upper surface wall 24 within the cavity C12. An embodiment of this type is in particular adapted for cases in which the temperature of the fluid or of the stream in which the blade has a large divergence compared to the cooling fluid circulating inside the blade 10.

In the examples shown in FIGS. 2 and 3, the blade 10 comprises reinforcing beams extending inside the through-cavities of the blade 10, from the blade 10 root to its upper partition wall, typically the transverse wall 26 defining the bottom of the squealer tip 28 of the blade 10.

In the examples shown in FIGS. 2 and 3, the blade 10 thus comprises two reinforcing beams 50 and 60 disposed respectively inside the second through-cavity C4 and the second through-cavity C7.

Each of these reinforcing beams 50 and 60 extends from the blade 10 root as far as its upper partition wall, and is disposed inside a through-cavity, while remaining un-connected to the lower surface wall 22, the upper surface wall 24 and the inner walls defining the through-cavities.

Each of the reinforcing beams 50 and 60 is thus situated entirely in a cooling stream of the blade 10, and are therefore at the temperature of the air circulating in the cooling stream considered, and are thus not impacted directly by the temperature of the lower surface wall 22 and of the upper surface wall 24. The blade root is in fact situated below the air stream, and operates at the temperature of the cooling air of the blade 10.

The presence of such reinforcing beams 50 and 60 thus allows holding back the centrifugal force without generating forces in the ortho-radial plane. To the extent that the reinforcing beams 50 and 60 hold back the centrifugal force, the other walls of the blade 10 can be made thinner, with thus allows minimizing, even eliminating the impact of the reinforcing beams on the weight of the blade 10 and on its cooling circuit.

The reinforcing beams 50 and 60 are typically centered on a median line of the blade 10 according to a section view in the radial direction, as can be seen in FIGS. 2 and 3, which improves the taking up of the centrifugal force by the reinforcing beams 50 and 60.

The number and placement of the reinforcing beams can vary depending on the geometry of the blade 10 and according to the conditions in which it is intended to operate. It is in fact clearly understood that the embodiments shown in FIGS. 2 and 3, each of which comprises two reinforcing beams, is not limiting, and that the blade 10 can include a single reinforcing beam, or even 3, 4, 5, or more than 5 reinforcing beams disposed in distinct through-cavities or several reinforcing beams which can be disposed inside the same through-cavity.

The reinforcing beams can be solid or hollow. Each of FIGS. 2 and 3 shows an embodiment in which the reinforcing beams 50 and 60 are solid.

In the case where the reinforcing beams are hollow, they can have bores taking the form of slots and/or holes thus allowing air circulation to be achieved inside the reinforcing beams, for example to define a stream of cooling fluid which must be routed to a critical zone of the blade 10 to the extent that a flow of this kind is thermally insulated with respect to the lower surface wall 22 and the upper surface wall 24.

The reinforcing beams typically have a circular, oval or ovoid cross section, it being understood that in the case of a blade 10 having several reinforcing beams, these can have distinct geometries. The reinforcing beams can moreover have a constant or variable cross section over the height of the beam 10.

Although the present invention has been described by referring to specific exemplary embodiments, it is clear that modifications and changes can be performed on these examples without departing from the general scope of the invention as defined by the claims. In particular, the number of cooling circuits and of cavities composing each of these circuits is not limited to those shown in this example. Consequently, the description and the drawings must be considered in an illustrative, rather than a restrictive sense.

It is also clear that all the features described with reference to a method are transposable, alone or in combination, to a device, and conversely, all the features described with reference to a device are transposable, alone or in combination, to a method.

The invention claimed is:

1. An aviation turbine blade extending in a radial direction from a blade root as far as an upper partition wall, said blade comprising a plurality of inner cavities defining at least one cooling circuit, each of said inner cavities being defined by walls among inner walls, a lower surface wall, an upper surface wall, the blade root and the upper partition wall,
said blade comprising at least a first lower surface cavity and a first upper surface cavity each adjacent to a first through-cavity and to a second through-cavity, the first upper surface cavity being adjacent to the upper surface wall, the first lower surface cavity being adjacent to the lower surface wall, each of said first and second through-cavities extending from the lower surface wall as far as the upper surface wall, the first through-cavity being isolated from the second through-cavity by inner walls,
the second through-cavity comprising a first inner wall extending from the upper surface wall as far as the first through-cavity, and a second inner wall extending from the lower surface wall as far as the first through-cavity, said first inner wall and second inner wall not being connected,
said blade further comprising a second lower surface cavity, a second upper surface cavity and a third through-cavity,
wherein the third through-cavity extends from the lower surface wall as far as the upper surface wall, each of the second lower surface cavity and the second upper surface cavity is adjacent to the second through-cavity and to the third through-cavity, the second upper surface cavity is adjacent to the upper surface wall, the second lower surface cavity is adjacent to the lower surface wall and wherein the third through-cavity comprises a third inner wall extending from the upper surface wall as far as the second through-cavity, and a fourth inner wall extending from the lower surface wall as far as the second through-cavity, said third inner wall and fourth inner wall not being connected, wherein the first through-cavity is located at a leading edge of the blade.

2. The blade according to claim 1, wherein the second through-cavity comprises a portion extending between the first lower surface cavity and the first upper surface cavity.

3. The blade according to claim 1, wherein the first lower surface cavity is fluidly connected to the first through-cavity, and the first upper surface cavity is fluidly connected to the second through-cavity.

4. The blade according to claim 1, wherein the third through-cavity comprises a portion extending between the second lower surface cavity and the second upper surface cavity.

5. The blade according to claim 1, wherein the second lower surface cavity is fluidly connected to the first upper surface cavity, and the second upper surface cavity is fluidly connected to the third through-cavity.

6. The blade according to claim 1, comprising a third lower surface cavity, a third upper surface cavity and a fourth through-cavity,
wherein the fourth through-cavity extends from the lower surface wall as far as the upper surface wall, each of the third lower surface cavity and the third upper surface cavity is adjacent to the third through-cavity and to the fourth through-cavity, the third upper surface cavity is adjacent to the upper surface wall, the third lower surface cavity is adjacent to the lower surface wall, and wherein the third through-cavity comprises a fifth inner wall extending from the upper surface wall as far as the fourth through-cavity, and a sixth inner wall extending from the lower surface wall as far as the fourth through-cavity, said fifth inner wall and sixth inner wall not being connected.

7. The blade according to claim 1, wherein at least one of the through-cavities comprises at least one reinforcing beam disposed inside one of said through-cavities, and connecting the blade root to the upper partition wall, said reinforcing beam not being connected to the inner walls, the lower surface wall and the upper surface wall.

8. A gas turbine including blades according to claim 1.

* * * * *